(12) United States Patent
Lien et al.

(10) Patent No.: US 9,341,493 B2
(45) Date of Patent: May 17, 2016

(54) METHOD AND APPARATUS FOR PROVIDING A USER INTERFACE, PARTICULARLY IN A VEHICLE

(75) Inventors: Annie Lien, Palo Alto, CA (US); Lorenz Laubinger, San Francisco, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 1260 days.

(21) Appl. No.: 13/089,037

(22) Filed: Apr. 18, 2011

(65) Prior Publication Data

US 2012/0266108 A1 Oct. 18, 2012

(51) Int. Cl.
*G06F 3/048* (2013.01)
*G01C 21/36* (2006.01)
*G06F 3/0482* (2013.01)

(52) U.S. Cl.
CPC ........ *G01C 21/3611* (2013.01); *G01C 21/3664* (2013.01); *G06F 3/0482* (2013.01)

(58) Field of Classification Search
CPC .............. G06F 3/0482; G01C 21/3664; G01C 21/3611
USPC ................. 715/841, 771–772, 845, 853–854, 715/862–864
See application file for complete search history.

(56) References Cited

U.S. PATENT DOCUMENTS

| 5,487,002 | A | * | 1/1996 | Diller et al. ...................... 701/1 |
| 5,740,053 | A | * | 4/1998 | Iwama ........................... 700/121 |
| 6,078,252 | A | * | 6/2000 | Kulczycki ........... B60R 16/0315 340/425.5 |
| 6,121,968 | A | | 9/2000 | Arcuri et al. |
| 6,304,817 | B1 | | 10/2001 | Troedel |
| 6,385,542 | B1 | | 5/2002 | Millington |
| 6,415,224 | B1 | * | 7/2002 | Wako et al. .................... 701/409 |
| 6,542,812 | B1 | | 4/2003 | Obradovich et al. |
| 6,700,479 | B2 | * | 3/2004 | Birchfield ............. B60R 25/104 340/425.5 |
| 7,580,793 | B2 | * | 8/2009 | Oguchi ......................... 701/425 |
| 7,987,046 | B1 | * | 7/2011 | Peterman et al. ............. 701/454 |
| 2001/0026291 | A1 | * | 10/2001 | Uchida ......................... 345/810 |
| 2002/0080192 | A1 | * | 6/2002 | King et al. .................... 345/811 |
| 2002/0105409 | A1 | * | 8/2002 | Nakamitsu et al. ............ 340/3.1 |
| 2003/0032455 | A1 | * | 2/2003 | Watanabe ......... H04M 1/72583 455/566 |
| 2004/0176906 | A1 | * | 9/2004 | Matsubara et al. ........... 701/200 |
| 2005/0021190 | A1 | * | 1/2005 | Worrell et al. .................... 701/1 |
| 2005/0039140 | A1 | * | 2/2005 | Chen ..................... G06F 3/0482 715/810 |
| 2005/0268253 | A1 | * | 12/2005 | Johnson ................ G06F 3/0482 715/841 |
| 2006/0123344 | A1 | * | 6/2006 | Volkov et al. ................. 715/730 |
| 2006/0256094 | A1 | * | 11/2006 | Inagaki ......................... 345/173 |

(Continued)

FOREIGN PATENT DOCUMENTS

| CN | 101395448 A | 3/2009 |
| JP | 2007-287135 A | 11/2007 |

(Continued)

*Primary Examiner* — Amy M Levy
(74) *Attorney, Agent, or Firm* — Barnes & Thornburg LLP

(57) ABSTRACT

The present invention relates to a method and an apparatus for providing a user interface, particularly in a vehicle, in which a structured volume of data is stored which relates to the scope of functions of at least one function. At least two hierarchically related modes of operation are predetermined which each produce and each at least partially display a user menu with controllable graphic objects on the basis of a predetermined subset of the structured volume of data, wherein a hierarchically higher mode of operation is based on a hierarchically higher subset of the structured volume of data.

18 Claims, 4 Drawing Sheets

(56) References Cited

U.S. PATENT DOCUMENTS

| | | |
|---|---|---|
| 2007/0008189 A1* | 1/2007 | Amari et al. ............. 340/995.19 |
| 2007/0032912 A1* | 2/2007 | Jung et al. ....................... 701/1 |
| 2007/0057915 A1* | 3/2007 | Yamauchi .................... 345/156 |
| 2007/0126698 A1* | 6/2007 | Iwamoto ............ G01C 21/3664 345/156 |
| 2007/0130522 A1* | 6/2007 | Mansell et al. ............... 715/744 |
| 2007/0130544 A1* | 6/2007 | Kim ..................... G06F 3/0482 715/828 |
| 2007/0153130 A1* | 7/2007 | Preissner et al. ............. 348/705 |
| 2007/0168890 A1* | 7/2007 | Zhao et al. ................... 715/863 |
| 2007/0233378 A1* | 10/2007 | Tanaka et al. ................. 701/211 |
| 2007/0261001 A1* | 11/2007 | Nagiyama ............ G06F 3/0482 715/810 |
| 2008/0092082 A1* | 4/2008 | Saito et al. ................... 715/841 |
| 2008/0215240 A1* | 9/2008 | Howard ................ G06F 3/0488 701/469 |
| 2008/0270948 A1* | 10/2008 | Lazzaro et al. ............... 715/854 |
| 2009/0079705 A1* | 3/2009 | Sizelove et al. .............. 345/173 |
| 2010/0127843 A1* | 5/2010 | Koenig ................ B60W 50/14 340/439 |
| 2011/0082619 A1* | 4/2011 | Small et al. ..................... 701/29 |

FOREIGN PATENT DOCUMENTS

| | | |
|---|---|---|
| JP | 2007-311049 A | 11/2007 |
| WO | 2007/101725 A2 | 9/2007 |

* cited by examiner

METHOD AND APPARATUS FOR PROVIDING A USER INTERFACE, PARTICULARLY IN A VEHICLE

BACKGROUND

The present invention relates to a method and an apparatus for providing a user interface, particularly in a vehicle, in which a structured volume of data is stored which relates to the scope of functions of at least one function. The present invention also relates to a vehicle having such an apparatus.

A vehicle, particularly a motor vehicle, contains various electronic devices which the driver or another vehicle occupant needs to be able to control. By way of example, these devices include a navigation system, a driver assistance system, convenience devices, such as the air conditioning installation and communication and infotainment applications, which comprise a telephone system, a radio or a CD player, for example.

Very specific requirements arise for the control of the diverse devices in a vehicle, since the control can be effected by the driver, inter alia. It is therefore very important that the control operation and the associated information intake do not result in the driver being distracted during the journey. The control operation should therefore require as little attention from the driver as possible, in particular, and also be simple and rapid to carry out.

In order to allow a user to access a multiplicity of vehicle functions simultaneously, the user menus provided for controlling the vehicle devices have become ever more complex. In order to be able to provide diverse functions tailored to an individual user, said functions comprise a multiplicity of options and possibilities for adjustment. On the other hand, the increasing complexity of the various vehicle devices makes them more difficult to control, however.

In addition, there are a series of further areas of application for such user interfaces. By way of example, they can be used generally for computers or multimedia appliances. In particular, they are also suitable for permitting control of vehicle functions by means of portable appliances which are not connected to the vehicle or which are connected to the vehicle only detachably, for example unlocking the vehicle using a mobile telephone.

U.S. Pat. No. 6,385,542 B1 describes a method for personalizing a menu for a vehicle navigation system. This allows the content of a fixed menu structure to be personalized. By way of example, telephone book entries and preferred routes can be matched to the respective driver of the vehicle, or the menu language can be stipulated.

U.S. Pat. No. 6,542,812 B1 describes a method for setting user preferences in a vehicle navigation system. This allows users to enter a profile for which appropriate special destinations on a route are selected, e.g. when selecting the displayed restaurant. A person may also have two identities between which it is possible to select, e.g. private and business.

U.S. Pat. No. 6,304,817 B1 describes a navigation and infotainment device in a vehicle which allows convenient operation. In this case, a user can store a profile. The user is then automatically recognized, e.g. by virtue of his mode of speaking, a code from the car key or by virtue of the driver's seat position, whereupon the relevant profile can be loaded.

SUMMARY

It is an object of the present invention to provide a method and an apparatus for providing a user interface of the type set out at the outset in which the user, particularly the driver of a vehicle, can easily control and read the functional devices and, in particular, can effect rapid access to the functions which are used most without having to restrict the scope of functions in the process.

The invention achieves this object by means of a method having the features of claim 1 and an apparatus having the features of claim 10. Advantageous forms and developments can be found in the dependent claims.

In the method according to the invention for providing a user interface, at least two hierarchically related subsets of the structured volume of data are predetermined, wherein a hierarchically higher subset of the structured volume of data comprises a hierarchically lower subset of the structured volume of data entirely. At least two hierarchically related modes of operation are predetermined which each produce and each at least partially display a user menu with controllable graphic objects on the basis of a predetermined subset of the structured volume of data, wherein a hierarchically higher mode of operation is based on a hierarchically higher subset of the structured volume of data. In the method according to the invention, a control command is captured and the control command is taken as a basis for selecting a mode of operation. The thus performed predetermination of certain subsets allows the user interface to be diversified into various levels of complexity. In this case, it is expedient if the number of levels of complexity, that is to say the number of hierarchic modes of operation, is itself not too great in order to prevent the user from losing track. An expedient number is between two and five hierarchic levels, for example, which are programmed in ex works.

Data relating to the scope of functions are particularly data which describe a function as such. They define how and/or under what algorithm the function is performed. By way of example, they are control data from modular subfunctions, from which the individual functions are produced. In contrast, there are function parameters, which define the content or the basis to which the function is to be applied. Function parameters are stored in databases of navigation destinations or radio stations, for example.

The user menu produced from the data may itself be hierarchic, i.e. not all menu entries need to be displayed immediately, but rather they may be organized on a plurality of menu levels. The subsets of the structured volume of data are in this case predetermined such that further menu items from the same menu level and/or a further menu level are produced and/or displayed in the hierarchically higher mode of operation in comparison with a hierarchically lower mode of operation, for example. This type of diversification while basically retaining an overall menu structure allows rapid and targeted access to frequently used basic functions which are provided in the user menu at the bottommost mode of operation, and at the same time access to little used function options which are provided in the user menu only in a hierarchically higher mode of operation.

The circumstance of a hierarchically lower subset being comprised entirely by a hierarchically higher subset applies to the underlying structured volume of data. In this case, the production of a user menu in a hierarchically higher mode of operation does not exactly need to comprise all the menu items from the hierarchically lower mode of operation in a 1:1 ratio. In a hierarchically lower mode, for example, the user menu may have provision for the discrete selection of a parameter for a function, e.g. high, middle and low, but allow stepless adjustment of this parameter in a hierarchically higher mode without permitting a predefined discrete selection in this case. The user menu then does not necessarily need to be controlled by means of the displayed graphical objects.

By way of example, the user interface can also be made multimodally, e.g. can be made by means of voice inputs, wherein the permitted voice commands are limited in a hierarchically lower mode of operation in comparison with a hierarchically higher mode of operation.

In one form of the invention, when the user interface is switched on, the control command is produced automatically and the most recently used mode of operation or the hierarchically lowest mode of operation is selected. By way of example, the user interface is recognized as being switched on when the ignition key is inserted or rotated or when the on button for the relevant functional device in the vehicle is operated. This does not prevent the user, particularly the driver of the vehicle, from selecting the mode of operation manually when the vehicle is started, particularly if he has been the last user of the vehicle. Automatic selection of the mode of operation therefore takes account of the fact that many vehicles are driven primarily by one person, with automatic selection of the most recently used mode of operation being practical. Should a person other than this primary driver drive the vehicle, automatic adjustment to the hierarchically lowest mode of operation is practical so as not to ask too much of the new driver, who may not be familiar with the menu structure of the vehicle devices. Alternatively, the automatic selection can also stipulate another mode of operation, e.g. a hierarchically middle mode of operation or the mode of operation used most in a period of time in the past. The nature of the selection can be matched to the specific use of the user interface in this case.

Provision may be made for the mode of operation to be selected automatically only after a predefined time interval has elapsed. When the user interface is switched on, e.g. when the onboard computer is booted, an acknowledgement is output to the user, for example, prompting him to select a mode of operation or involving the preset mode of operation being displayed in a preselection. The user now has the opportunity to react to this or not. If the user prefers to ignore the acknowledgement, whether because he has no time for this or because he is in agreement with the presetting of the mode of operation, a mode of operation which is probably correct is selected automatically.

Alternatively, the control command for selecting the mode of operation can also be effected by virtue of a user input, including during operation, for example, when the user interface has already been activated. In any mode of operation, for example, a suitable entry can then be displayed in the user menu, e.g. a symbol, which can be used to alter the mode of operation.

The invention may provide for the representation of the user menu in a hierarchically lower mode of operation to be visually simplified in comparison with the representation of the user menu in a hierarchically higher mode of operation. The underlying subset of the structured volume of data for these two modes of operation may also be the same in this case. Only the simplified presentation of the user menu in the hierarchically lower mode of operation is different in this case. In particular, simpler symbols, fewer colors and/or a larger presentation can be chosen, regardless of whether or not the underlying subset of the structured volume of data is the same for the two modes of operation. If a plurality of display areas are provided for the user menu in the vehicle, a visually simplified representation may also be implemented in the form of a concentration on one of these display panels.

Besides selection of a mode of operation using a firmly prescribed user menu, one form of the method according to the invention may advantageously have provision for the predetermined subsets of the structured volume of data, on the basis of which the user menus of the hierarchic modes of operation are determined, to be able to be reconfigured in at least one mode of operation by a user input. This may expediently be provided for the highest mode of operation or possibly for a plurality of hierarchically higher modes of operation. This allows a user to configure or personalize the user menu of the hierarchically lowest mode of operation, but without the corresponding multiplicity of menu entries in this mode of operation rendering the user menu confusing.

In accordance with one development of the method according to the invention, during operation of the user interface, event data for changing between two modes of operation and/or event data for reconfiguring the user menu of at least one mode of operation are captured, the event data are evaluated, and the user menu of at least one hierarchic mode of operation is automatically reconfigured by altering the associated subset of the structured volume of data. This allows the system to be rendered capable of learning, and it is possible to consider how the user actually requires the predetermined subsets.

By way of example, the event data comprise parameters which are associated with the change between two modes of operation. By way of example, such parameters are the time of the change and/or the operating conditions of the vehicle at the time of the change, e.g. the vehicle speed or engine speed. By way of example, the event data also comprise a single data entry from the structured volume of data, which data entry has been added or deducted to/from a subset when the subset was altered, and the menu entry associated with such a data entry. The event data advantageously also comprise the hierarchy levels for the two modes of operation, between which a change has been made. In addition, it is also possible for a menu selection following the change of mode of operation to be captured in the user menu and added to the event data.

In one form of this development of the method according to the invention, provision may be made for the subset of the structured volume of data to be altered, so that a further menu level and/or a menu item from the same menu level are transferred from a hierarchically higher mode of operation to a hierarchically lower mode of operation when said menu level or said menu item has been taken into account after the change to a hierarchically higher mode of operation or when a mode of operation is reconfigured. This advantageously prompts frequently used menu items and/or menu levels to be automatically transferred to a lower mode of operation and hence to correct any less than optimally predetermined subsets themselves.

Within the context of the invention, taking into account is a selection of a menu item in a higher mode of operation after a change from a lower mode of operation to said higher mode of operation, for example. Taking into account can also be assessed as such only when the menu level or the menu item has been selected more than once, e.g. twice in succession, within a given time window. In addition, an entire menu level can be taken into account when an associated menu item has been taken into account during reconfiguration into a lower mode of operation.

In the method according to the invention, the user interface may comprise a user menu for a driver assistance system, for an infotainment device, for a communication device and/or for a convenience system in the vehicle. On account of the greatly increasing scope of functionality of these vehicle functions, it is advantageous to provide various modes of operation based on levels of complexity.

The apparatus according to the invention for providing user interface, particularly in a vehicle, comprises a memory unit for storing a structured volume of data which relates to the scope of functions of at least one function, a display panel for presenting graphical objects from a user menu, and a control apparatus which is connected to the memory unit and to the display panel and by means of which a control command can be captured. The apparatus according to the invention for providing a user interface is characterized in that the structured volume of data is stored in at least two hierarchically related subsets in the memory unit, wherein a hierarchically higher subset of the structured volume of data comprises a hierarchically lower subset of the structured volume of data entirely. It is furthermore characterized in that the user interface can be operated by means of the control apparatus in at least two hierarchically related modes of operation which each produce and at least partially display on the display panel controllable graphical objects from the user menu on the basis of a stored subset of the structured volume of data, wherein a hierarchically higher mode of operation is based on a hierarchically higher subset of the structured volume of data, and in that the control apparatus can be used to select a mode of operation on the basis of a captured control command. The apparatus is particularly suitable for carrying out the method according to the invention. It therefore also has the advantages of the method according to the invention.

Furthermore, the invention equips a vehicle with such an apparatus for providing a user interface.

BRIEF DESCRIPTION OF THE DRAWINGS

The invention will now be explained in more detail using exemplary embodiments with reference to the figures.

DETAILED DESCRIPTION

Figure 1:
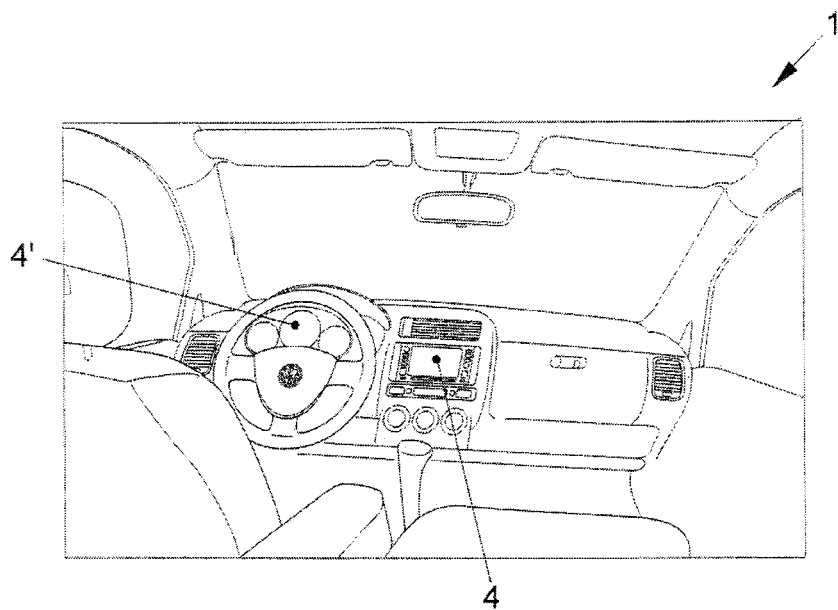
FIG. 1 shows a display panel—arranged in a vehicle—for an apparatus for providing a user interface in accordance with an exemplary embodiment of the invention.

FIG. 1 shows a cockpit of a vehicle 1 which is equipped with an apparatus 2 (see FIG. 2) for providing a user interface in accordance with an exemplary embodiment of the invention. A display panel 4 is arranged in the upper region of the center console, so that it can be easily viewed and, when appropriate, controlled by a driver and passenger. Further display panels 4' may be provided, for example in a combined appliance between the round instruments.

Figure 2:
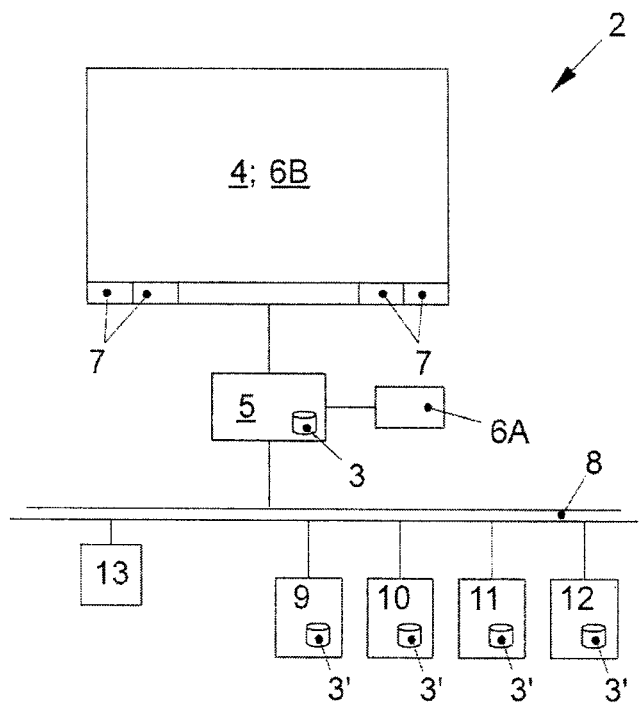
FIG. 2 shows the schematic design of an apparatus for providing a user interface in a vehicle in accordance with an exemplary embodiment of the invention, FIG. 3 schematically shows the data structure of various function blocks and the association thereof on user menus of various modes of operation in accordance with an exemplary embodiment of the invention, FIGS. 4A-4C schematically show graphical outputs for selecting a mode of operation and graphical representations of user menus of various modes of operation in accordance with an exemplary embodiment of the method according to the invention, and FIGS. 5A-5B schematically show the flow of an exemplary embodiment of the method according to the invention for providing a user interface.

FIG. 2 schematically shows the design of such an apparatus 2 for providing a user interface in a vehicle 1. In the example shown, the display panel 4 is in the form of a touchscreen 6B, so that a control operation can be detected by virtue of the graphical objects presented on the display panel 4 being touched. As an alternative or else in addition, further input options may be provided, e.g. a touchpad 6A or operator control elements 7 which are fitted close to the display panel 4 or at a suitable position, so that they can easily be controlled by the driver or passenger. These can be used to capture a user input, for example, by means of which the mode of operation of the user interface can be altered and/or a user menu M1, M2, M3, M4 presented on the display panel 4 can be controlled.

The display panel 4 and the various input options 6A, 6B, 7 are connected to a control apparatus 5 which is in turn connected to various functional units in the vehicle via the data bus 8. In the example shown, these are a driver assistance system 9, which comprises a navigation system, an infotainment device 10, a communication device 11 and a convenience system 12, which comprises an air conditioning installation.

Furthermore, the control apparatus 5 is connected by means of the data bus 8 to means 13 for detecting the operating state of the vehicle 1. In particular, the means 13 for detecting the operating state can be used to detect whether the ignition of the vehicle 1 has been activated or the engine has been started. In addition, the means 13 can be used to detect the state of other aids provided for controlling the vehicle 1, such as screen wipers or the alternator, and also further vehicle parameters, e.g. the engine speed and the vehicle speed. The control apparatus 5 can take these data and parameters captured in this manner and produce a control command for selecting a mode of operation or ascertain event data which are related to a change of mode of operation, as will be explained in more detail further below with reference to the method according to the invention.

The control apparatus 5 incorporates a memory unit 3 which stores a structured volume of data which defines the scope of functions that can be controlled by the user in relation to the functions provided by the functional units 9, 10, 11, 12. The memory unit 5 can also be used to store the event data transmitted by the means 13 for detecting the operating state. The subvolumes of data respectively associated with the functions of the individual functional units 9, 10, 11, 12 may also be stored in the respective functional units 9, 10, 11, 12 in a dedicated memory unit 3'.

Figure 3:
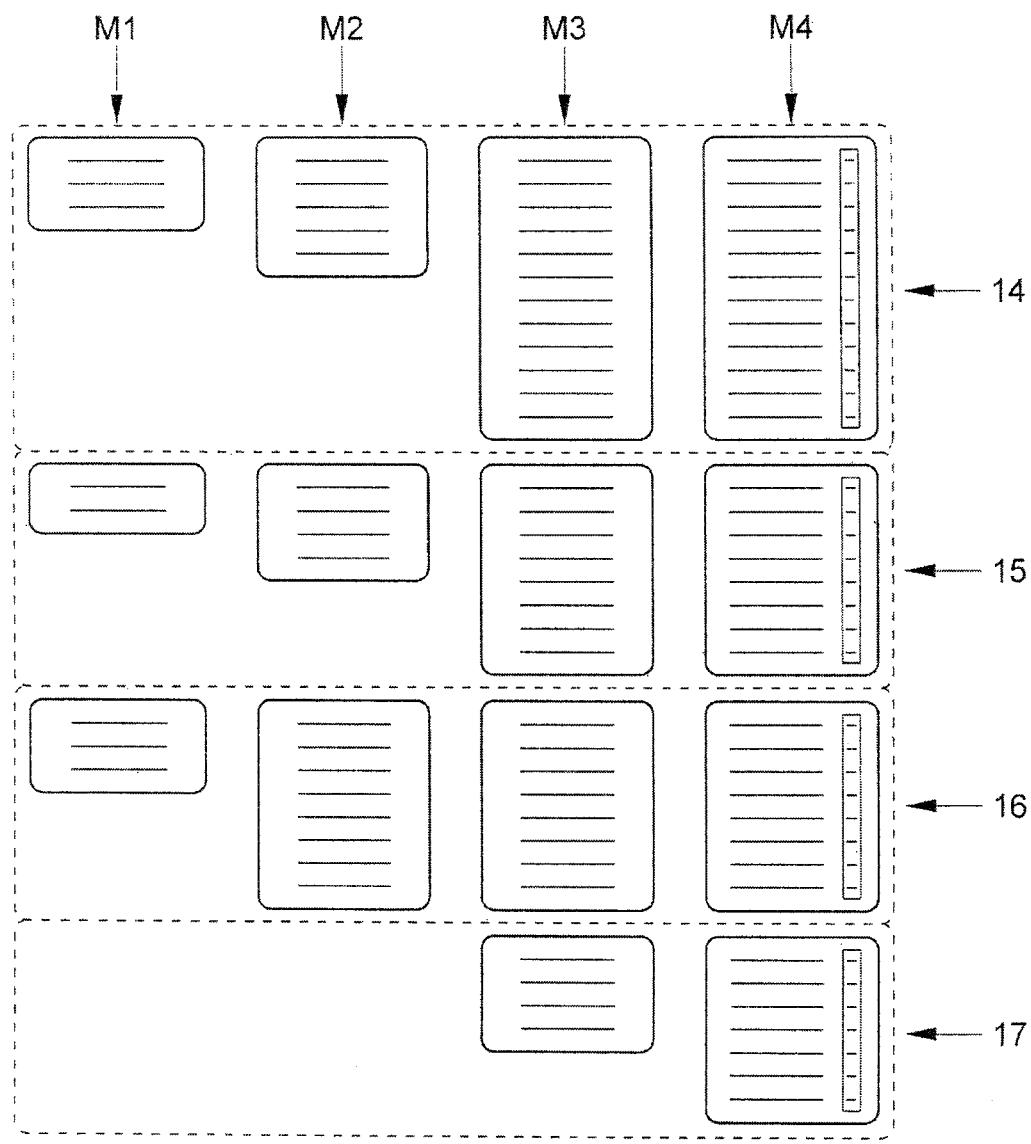

FIG. 3 schematically shows the data structure of various function blocks 14, 15, 16, 17 and the association thereof on user menus M1, M2, M3, M4 of various modes of operation in accordance with an exemplary embodiment of the invention. By way of example, the function blocks 14, 15, 16, 17 may be various functions of a single functional device or else of a plurality of functional devices 9, 10, 11, 12. They may themselves intrinsically have a hierarchic data structure, or several of them may be interrelated by means of a superordinate data hierarchy level (not shown).

A user menu M1, M2, M3, M4 of various hierarchically related modes of operation is based on a subset of the entire volume of data, the content of any subset being predetermined. The user menu M1 is provided in the hierarchically lowest mode of operation, and the user menu M4 is accordingly provided in the hierarchically highest of the four modes of operations provided in this exemplary embodiment. The volume of data subset on which the individual user menus M1, M2, M3, M4 are based is permanently stored in the memory units 3' of the respective functional units 9, 10, 11, 12 ex works, for example. In this case, the subset of the data for the user menu M2 comprises the subset of the data for the user menu M1, the subset of the data for the user menu M3 comprises the subset of the data for the user menu M2, and the subset of the data for the user menu M4 comprises the subset of the data for the user menu M3.

The bottommost level of the mode of operation is advantageous for undemanding users or for users who are unfamiliar with the respective functional apparatus and have no interest or no time to pore over the configuration options or function selection. The slimline user menu M1 can be used by such a user for rapid function selection. On the other hand, an experienced user has the option of exhausting the niceties of the system in the highest mode of operation M4. By providing a plurality of modes of operation, it is possible to switch quickly to and fro between these user menus M1, M2, M3, M4 of different complexity.

In the exemplary embodiment shown, functions from various function blocks 14, 15, 16, 17 of a navigation system associated with the driver assistance system 9 are shown.

Function block 14 comprises functions for destination input. In the hierarchically lowest mode of operation, the menu M1 with the functions "Input road name" and "Select most recently used addresses" is provided. In the hierarchically second lowest mode of operation, the menu M2 with the functions of the menu M1 and also further options for address input is provided, e.g. destination input by means of road junctions. In the hierarchically second highest mode of operation, the menu M3 with the functions of menu M2 and also all other options for address input is provided, e.g. including searching for the address in a graphically presented map or destination input in the form of a special destination. In the hierarchically highest mode of operation, the menu M4 with the functions of menu M3 is provided. In this case, the menu items are not only displayed for selection, however, the user is also able to configure and personalize them according to his needs. In particular, he is able to alter function parameters and to assign each function a profile which stipulates that hierarchy level of the mode of operation from which the function is meant to be contained in the user menu and how this can possibly be presented graphically. In addition, in this mode of operation the user has the option of combining a plurality of functions with one another, e.g. by means of logic combination of a plurality of search criteria.

Function block 15 comprises functions for route planning. In the hierarchically lowest mode of operation, the menu M1 with the functions "Search for fastest route" is provided, with the options of excluding toll roads and/or highways. In the hierarchically second lowest mode of operation, the menu M2 with the functions of menu M1 and also further options for route planning is provided, e.g. the function "Search for shortest route" and the option of avoiding or excluding heavily trafficked roads. In the hierarchically second highest mode of operation, the menu M3 with the functions of menu M2 and also all other options for route planning is provided, e.g. the functions "Search for most environmentally friendly route", "Search for most scenic route". In the hierarchically highest mode of operation, the menu M4 with the functions of menu M3 is provided, again with the option of being able to configure and personalize said functions.

Function blocks 16, 17 comprise further functions, e.g. relating to the selection criteria for special destinations and relating to the options for the output of functions. In this case, the function block 17 is not actually provided in the user menu M1, for example.

Menus can also be stipulated in similar fashion for other functions and other functional units, e.g. for control menus for the radio or CD player in an infotainment device 10 or the air-conditioning control in a convenience device 12.

Figure 4A:
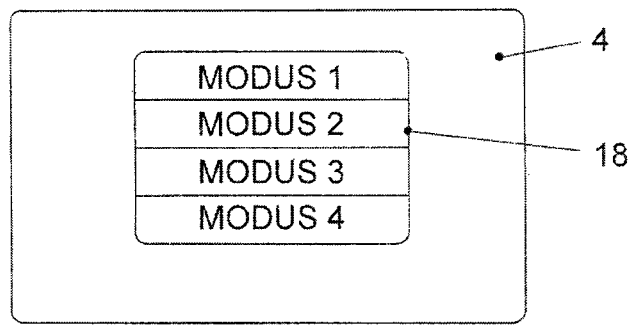
Figure 4B:
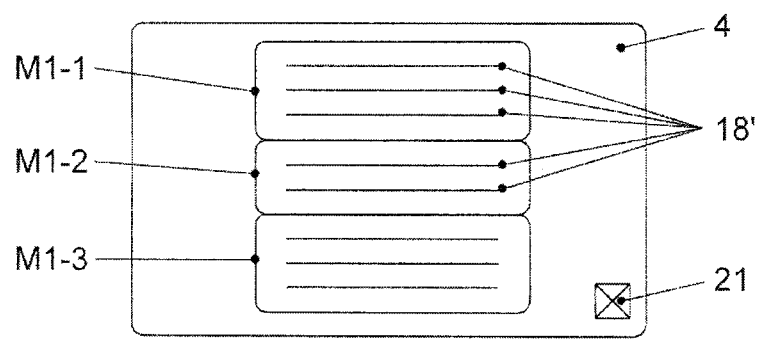
Figure 4C:
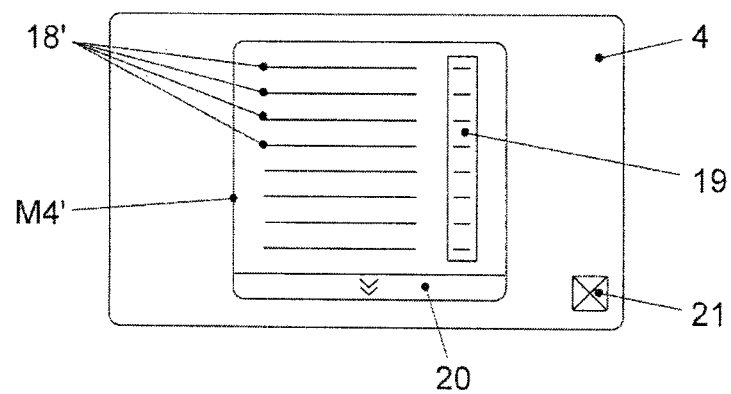

The method according to the invention will now be described using an exemplary embodiment with reference to FIGS. 4A-4C and 5A-5B. This may particularly involve the use of the apparatus 2 according to the invention that is described with reference to FIG. 2 and the data structure of the function blocks 14, 15, 16, 17 and hierarchic user menus M1, M2, M3, M4 that is described with reference to FIG. 3. Whereas FIGS. 5A-5B show the schematic flow of an exemplary embodiment of the method according to the invention, FIGS. 4A-4C schematically show graphical outputs for the individual method steps.

Figure 5A:
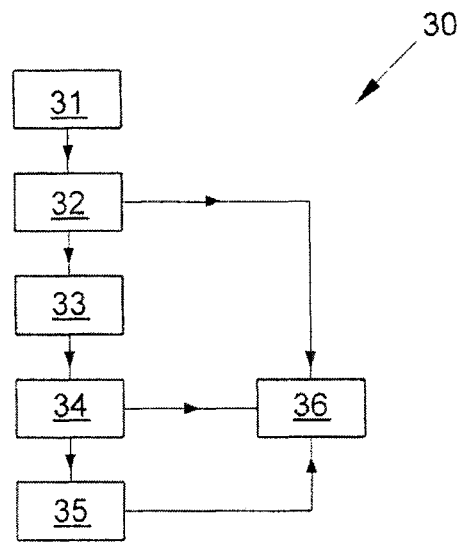
Figure 5B:
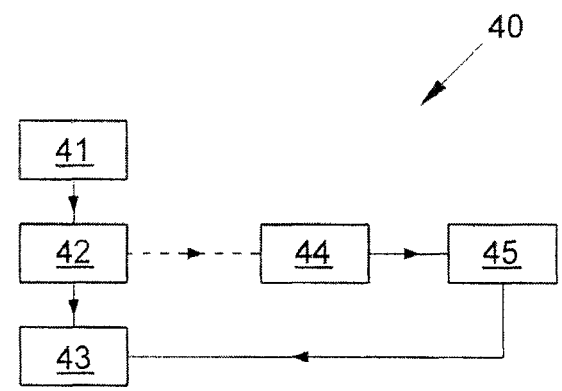

FIG. 5A shows the flow 30 of the selection of the mode of operation when the user interface is switched on. In a first method step 31, the switching on of the user interface is recognized. By way of example, the means 13 for detecting the operating state are used to detect when the ignition key is inserted into the ignition and/or the ignition is started. It is also possible for the switching on of the user interface to be detected by means of a control action using one of the operator control elements 7 if this starts one of the functional units, e.g. the driver assistance system 10.

In one embodiment of the method according to the invention, a method step 32 involves a check to determine whether the initial selection of the mode of operation is intended to take place automatically. If this is the case, a method step 36 involves the most recently used mode of operation or the hierarchically lowest mode of operation being selected and the associated user menu M1 or M1, M2, M3, M4 being displayed on the display panel 4. If automatic selection of the mode of operation is not intended to take place, a method step 33 involves a graphical object 18 for the selection of the mode of operation being presented on the display panel 4 by virtue of every selectable mode of operation appearing as a list entry in the graphical object 18, as shown in FIG. 4A.

In a further method step 34, the user is now able to make a user input using one of the input means, e.g. using the touchscreen 6B. The relevant mode of operation is then selected in method step 36 and the associated user menu M1, M2, M3, M4 is displayed on the display panel 4. In one embodiment of the method according to the invention, in a method step 35, if no user interface for selecting a mode of operation has been made when a predefined time interval has elapsed, the mode of operation is selected automatically by a timeout in similar fashion to method step 32.

FIG. 4B shows the user menu M1 for the hierarchically lowest mode of operation by way of example. Since the user menu is limited to a minimum in this mode of operation, all the submenus M1-1-M1-3 associated with the function blocks 14-16, for example, can be presented on the display panel 4 simultaneously as graphical objects 18' for the selection of a menu item or of a menu level. This makes it easier for an inexperienced user, in particular, to keep track and speeds up the access to the simple and most used functions. In addition, a symbol 21 for changing the mode of operation is displayed to the user at the bottom right-hand edge of the display panel 4. By way of example, the user can return to the view shown in FIG. 4A by touching the relevant position on the touchscreen 6B or by operating an operator control element 7 associated with this symbol 21 and in this way can change the mode of operation conveniently and quickly (not shown).

FIG. 4C shows an example of a display in the hierarchically highest mode of operation. Since the user menu M4 is too extensive and complex in this mode of operation, only a partial view M4' of the user menu M4 can be presented on the display panel 4. The symbol 21 for changing the mode of operation continues to be displayed at the bottom right-hand edge of the display panel 4.

In particular, the graphical representation of the user menu M1, M2, M3, M4 may be different in the various modes of operation. It is expedient to simplify the graphical representation visually as far as possible in the hierarchically lowest mode of operation in order to make it easier for the inexperienced user or any user to control the user menu in certain situations, e.g. in difficult traffic conditions (high volume of traffic, high vehicle speed, adverse weather, darkness). Depending on the situation, the individual graphical objects 18, 18' are presented in larger form or using graphically simpler forms, for example, so that they can quickly be detected by the user. In hierarchically higher modes of operation, the user menu may not only be designed to be visually more complex, it may also be distributed over a plurality of display panels 4, 4', for example. In this case, the display panel 4', which is not used for presenting the user menu M1 of the hierarchically lowest mode of operation, is used for presenting submenus or for an excerpt from the user menu M3, M4 which is presented on the display panel 4, for example.

FIG. 5B shows the flow 40 of the selection of the mode of operation during operation of user interface. In this case, the user interface is first of all in an arbitrary mode of operation M1, M2, M3, M4 in a first method step 41, as were selected in method step 36, for example, as mentioned previously. In a further method step 42, the user input is detected. The user input can, as described previously, select the symbol 21 in order to produce a control signal which can initiate a change between two modes of operation. Alternatively, a user input may involve, at least in a hierarchically higher mode of operation, scrolling between two menu levels, scrolling within one menu level or reconfiguring the user menu associated with a mode of operation. In this case, the user input is detected by means of a button 20 for scrolling (FIG. 4B), for example, or by means of a configuration bar 19 for reconfiguring a user menu, for example. A method step 43 then involves a check to determine whether the user input is relevant to the selected mode of operation, and what relevance it has, and whether possibly a user menu M1, M2, M3, M4 and the underlying subset of the structured volume of data need to be altered.

For every user input in accordance with method step 42, event data 44 can be captured and stored in the memory unit 3. These event data may comprise data for changing from one mode of operation to another mode of operation or the reconfiguration of the user menu M1, M2, M3, M4 of a mode of operation. In addition, the event data may comprise parameters for operating the vehicle or the situation which have been detected by means of the means 13 for detecting the operating state. By way of example, the speed of the vehicle, the operating state of the alternator and/or the screen wiper are detected for a particular event. This allows advantageous adjustments to the user menus M1, M2, M3, M4 in the event of high-speed driving, darkness and/or adverse weather, for example, to be assessed on a situation-specific basis.

A further method step 45 involves the event data being evaluated. By way of example, such evaluation takes place continuously at regular intervals or on an event-driven basis. The evaluation may involve determining the number of repetitions of an event, i.e. determining whether two events which are identical or which are similar on the basis of prescribed criteria have occurred. Particularly for events with a relatively high number of repetitions, it can be assumed that this is not a random event. By way of example, the change between two modes of operation when a limit speed is exceeded or undershot is observed. In this case, it can be assumed by the system that the user considers a change between said modes of operation to be advantageous under the given circumstances, which means that this can be taken into account for method step 43 of automatically reconfiguring a mode of operation and/or for an automatic change between two modes of operation.

LIST OF REFERENCE SYMBOLS

1 Vehicle
2 Apparatus for providing a user interface
3, 3' Data memory
4, 4' Display panel
5 Control apparatus
6A Touchpad
6B Touchscreen
7 Operator control elements
8 Data bus in the vehicle
9 Driver assistance system
10 Infotainment device
11 Communication device
12 Convenience system in the vehicle
13 Means for detecting the operating state
14-17 Data from a first to fourth function block
18 Graphical object for selecting the mode of operation
18' Graphical object for selecting a menu item/a menu level
19 Configuration bar
20 Button for scrolling
21 Symbol for changing the mode of operation
30 Flow of the mode of operation selection when switching on
31 User interface switched on
32 Automatic yes/no selection
33 Display of the options for mode of operation selection
34 User input
35 Timeout
36 Mode of operation selection
40 Flow of the mode of operation selection during operation
41 Present mode of operation
42 User input
43 New mode of operation
44 Capture of event data
45 Evaluation of the event data
M1-M4 User menus
M1-1-M1-3 Submenus

The invention claimed is:

1. A method for providing a user interface in a vehicle in which a structured volume of data is stored which relates to the scope of functions of at least one function the method comprising:
   predetermining at least two hierarchically related subsets of the structured volume of data, wherein a hierarchically higher subset of the structured volume of data comprises a hierarchically lower subset of the structured volume of data entirely;
   predetermining at least two hierarchically related modes of operation, which each produce and at least partially display a user menu with controllable graphic objects based on a predetermined subset of the structured volume of data, wherein a hierarchically higher mode of operation is based on the hierarchically higher subset of the structured volume of data;
   capturing a control command; and
   selecting a mode of operation based on the captured control command,
   wherein the subsets of the structured volume of data are predetermined such that further menu items from the same menu level are produced and displayed in the hierarchically higher mode of operation in comparison with a hierarchically lower mode of operation;
   wherein, when the user interface is switched on via the ignition, the control command is produced automatically in response thereto and, independent of user input, a most recently used mode of operation is selected.

2. The method of claim 1, wherein the mode of operation is selected automatically after a predefined time interval has elapsed.

3. The method of claim 1, wherein the representation of the user menu in a hierarchically lower mode of operation is visually simplified in comparison with the representation of the user menu in a hierarchically higher mode of operation.

4. The method of claim 1, wherein the predetermined subsets of the structured volume of data are reconfigured in at least one mode of operation by a user input based on which of the user menus for the hierarchic modes of operation are determined.

5. The method of claim 1, further comprising:
capturing event data for changing between two modes of operation and/or event data for reconfiguring the user menu of at least one mode of operation;
evaluating the event data; and
automatically reconfiguring the user menu of at least one hierarchic mode of operation by altering the associated subset of the structured volume of data.

6. The method of claim 5, wherein the subset of the structured volume of data is altered so that a further menu level or a menu item from the same menu level is transferred from a hierarchically higher mode of operation to a hierarchically lower mode of operation when the menu level or the menu item has been taken into account after the change to a hierarchically higher mode of operation or when a mode of operation is reconfigured.

7. The method of claim 1, wherein the user interface comprises a user menu for at least one system or a device in the following systems or devices driver assistance systems: infotainment devices, communication devices, and convenience systems in the vehicle.

8. The method of claim 1, wherein the subsets of the structured volumes of data are predetermined such that a further menu level is produced and displayed in the hierarchically higher mode of operation in comparison with a hierarchically low mode of operation.

9. An apparatus for providing a user interface in a vehicle, the apparatus comprising:
a memory unit that stores a structured volume of data which relate to the scope of functions of at least one function;
a display panel that presents graphical objects from a user menu; and
a control apparatus connected to the memory unit and to the display panel and which captures a control command,
wherein the structured volume of data is stored in at least two hierarchically related subsets in the memory unit,
wherein a hierarchically higher subset of the structured volume of data comprises a hierarchically lower subset of the structured volume of data entirely,
wherein the user interface is operated using the control apparatus in at least two hierarchically related modes of operation, which each produce and at least partially display on the display panel controllable graphical objects from the user menu based on a stored subset of the structured volume of data,
wherein a hierarchically higher mode of operation is based on the hierarchically higher subset of the structured volume of data, and
wherein the control apparatus selects a mode of operation based on a captured control command,
wherein the subsets of the structured volume of data are predetermined such that further menu items from the same menu level are produced and displayed in the hierarchically higher mode of operation in comparison with a hierarchically lower mode of operation; and
wherein the control apparatus is configured to capture a scrolling command to scroll between the hierarchical higher and lower modes of operation,
wherein event data for changing between two modes of operation are captured, the event data are evaluated and the user menu of at least one hierarchic mode of operation is automatically reconfigured by altering the associated subset of the structured volumes of data based on the event data, the event data comprises the speed of the vehicle, the operating state of the alternator, or the operating state of the screen wiper.

10. The apparatus of claim 9, wherein the subsets of the structured volumes of data are predetermined such that a further menu level is produced and displayed in the hierarchically higher mode of operation in comparison with a hierarchically lower mode of operation.

11. The apparatus of claim 9, wherein, when the user interface is switched on, the control command is produced automatically and a most recently used mode of operation or a hierarchically lowest mode of operation is selected.

12. The apparatus of claim 9, wherein the mode of operation is selected automatically after a predefined time interval has elapsed.

13. The apparatus of claim 9, wherein the representation of the user menu in a hierarchically lower mode of operation is visually simplified in comparison with the representation of the user menu in a hierarchically higher mode of operation.

14. The apparatus of claim 9, wherein the predetermined subsets of the structured volume of data are reconfigured in at least one mode of operation by a user input based on which of the user menus of the hierarchic modes of operation are determined.

15. The apparatus of claim 9, wherein the subset of the structured volume of data is altered so that a further menu level or a menu item from the same menu level is transferred from a hierarchically higher mode of operation to a hierarchically lower mode of operation when the menu level or the menu item has been taken into account after the change in a hierarchically higher mode of operation or when a mode of operation is reconfigured.

16. The apparatus of claim 9, wherein event data for reconfiguring the user menu of at least one mode of operation are captured, the event data are evaluated and the user menu of at least one hierarchic mode of operation is automatically reconfigured by altering the associated subset of the structured volume of data.

17. The apparatus of claim 16, wherein the subset of the structured volume of data is altered so that a further menu level or a menu item from the same menu level is transferred from a hierarchically higher mode of operation to a hierarchically lower mode of operation when said menu level or said menu item has been taken into account after the change in a hierarchically higher mode of operation or when a mode of operation is reconfigured.

18. The apparatus of claim 9, wherein the user interface comprises a user menu for at least one system or a device in the following system or devices:
driver assistance system, infotainment devices, communication devices, and convenience systems in the vehicle.

* * * * *